United States Patent [19]

Squires et al.

[11] Patent Number: 4,979,056

[45] Date of Patent: Dec. 18, 1990

[54] DISK DRIVE SYSTEM CONTROLLER ARCHITECTURE

[75] Inventors: John P. Squires, Jamestown; Thomas A. Fiers, Longmont; Louis J. Shrinkle, Boulder, all of Colo.

[73] Assignee: Conner Peripherals, Inc., San Jose, Calif.

[21] Appl. No.: 57,289

[22] Filed: Jun. 2, 1987

[51] Int. Cl.⁵ .................... G11B 15/18; G11B 19/02
[52] U.S. Cl. ......................................... 360/69; 360/70
[58] Field of Search ................... 360/69, 70, 71, 72.1, 360/72.3, 88, 97, 98, 99

[56] References Cited

U.S. PATENT DOCUMENTS

| | | | |
|---|---|---|---|
| 4,086,659 | 4/1978 | Cizmic et al. | 360/78.07 |
| 4,639,863 | 1/1987 | Harrison et al. | 360/97.01 X |
| 4,658,307 | 4/1987 | Tsuyuguchi et al. | 360/71 |
| 4,660,106 | 4/1987 | Harrison et al. | 360/71 |
| 4,669,004 | 5/1987 | Moon et al. | 360/77.08 |
| 4,739,422 | 4/1988 | Kamei | 360/106 |
| 4,825,321 | 4/1989 | Hassel et al. | 360/51 |

Primary Examiner—David J. Severin
Attorney, Agent, or Firm—Fliesler, Dubb, Meyer & Lovejoy

[57] ABSTRACT

The control system manages the storage and retrieval of data with respect to a rotating media, wherein an actuator is utilized in the selection of data for storage and retrieval. The control system includes a low level media control circuit that permits the selection of the rotational position of the rotating media and an actuator control circuit that permits the selection of the position of the actuator with respect to the rotating media. A system controller is utilized to direct the operation of the low level media and actuator control circuits whereby the system controller specifies and adjusts, in real time, the incremental selection of the rotational position of the rotating media and the position of the actuator with respect to the rotating media. In the preferred embodiment of the present invention, the system controller is a programmable microcontroller operating in closed loop, event driven response to the occurrence of control information and data stored by the rotating media so that all essential operation required for the successful storage and retrieval of data with respect to the rotating media are performed concurrently and in real time by the microcontroller.

21 Claims, 9 Drawing Sheets

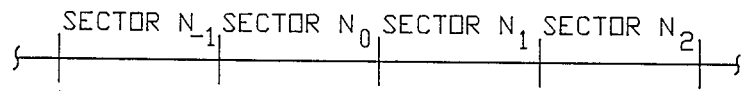
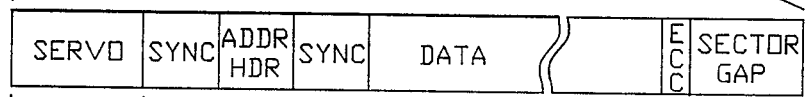
FIG.-2a
FIG.-2b
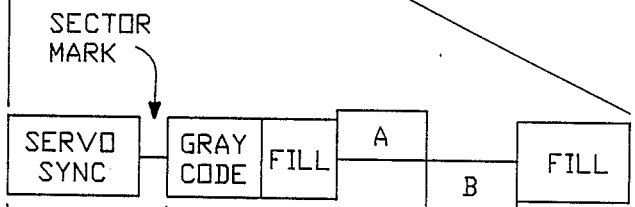
FIG.-2c
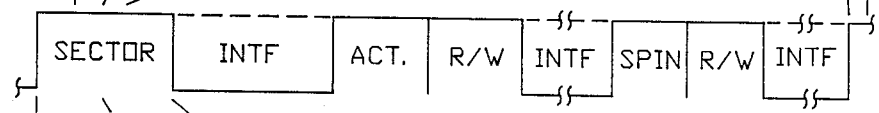
FIG.-2d
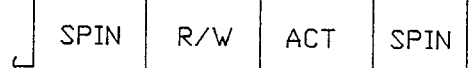
FIG.-2e

DISK DRIVE SYSTEM CONTROLLER ARCHITECTURE

CROSS-REFERENCE TO RELATED APPLICATIONS

The present application is related to the following Applications, all assigned to the Assignee of the present Application:

1. DISK DRIVE SOFTWARE SYSTEM ARCHITECTURE, invented by J. P. Squires et al, application Ser. No. 057,806, filed June 2, 1987;

2. DISK DRIVE SOFTWARE SYSTEM ARCHITECTURE UTILIZING IMBEDDED REAL TIME DIAGNOSTIC MONITOR, invented by J. P. Squires, application Ser. No. 058,289, , filed June 2, 1987;

3. ACTUATOR FOR DISK DRIVE, invented by F. M. Stefansky, application Ser. No. 056,602, filed May 29, 1987;

4. LATCH MECHANISM FOR DISK DRIVES, invented by F. M. Stefansky et al, application Ser. No. 056,142, filed May 29, 1987;

5. DISK DRIVE ARCHITECTURE, invented by F. M. Stefansky et al, application Ser. No. 056,584; filed May 29, 1987.

6. METHOD AND APPARATUS FOR BRUSHLESS DC MOTOR SPEED CONTROL, invented by J. P. Squires et al, application Ser. No. 880,754; filed July 1, 1986.

FIELD OF THE INVENTION

The present invention is generally related to rotating media type data storage devices and, in particular, to secondary mass data storage devices typically employing rotating magnetic media for the storage and retrieval of data in support of high-performance data processing systems.

BACKGROUND OF THE INVENTION

There has been and continues to be an ever-increasing demand for secondary mass storage peripherals capable of storing increasing amounts of data in machine-readable form. This desire is coupled to a need to concurrently decrease the average time required to access any particular stored data. In addition, there is the commercial necessity to also reduce the costs associated with such secondary mass data storage devices.

Advances in the development of conventional hard-disk drive type data storage peripherals have been made to generally satisfy, albeit temporarily, the aforementioned desires. The principal gains in total data storage capability come from improvements in the achievement of linear recording bit densities in excess of 14,000 flux changes per inch and track densities of greater than 1,000 per inch. Some gains in the reduction of average access times have come from mechanical improvements in the actuator arm design and construction. Some measurable gains have also been achieved through the utilization of dedicated electronic controllers to manage actuator seek operation and thereby yield a net reduction in the average access time. This use of dedicated hardware is often extended to provide dedicated control of the spin motor rate of rotation and the closed loop actuator control needed to precisely follow a single track. This extended use of dedicated electronic control hardware is generally encouraged since it broadly reduces the cost of manufacture and assembly of disk drives.

Unfortunately, the use of dedicated electronic hardware architecturally reduces the design, initial setup and long term operative flexibility of the disk drive. Unique trimming or tailoring of the electronic and mechanical components of a disk drive, particularly with respect to one another, is sacrificed for the low cost mass producibility of the dedicated electronic control hardware.

SUMMARY OF THE INVENTION

A purpose of the present invention is therefore to obtain a highly flexible disk drive control system that, by its architectural design, retains a high degree of flexibility while remaining imminently mass producible.

This is achieved in the present invention by the provision of a control system for managing the storage and retrieval of data with respect to a rotating media, wherein an actuator is utilized in the selection of data for storage and retrieval. The control system includes a low level media control circuit that permits the selection of the rotational position of the rotating media and an actuator control circuit that permits the selection of the position of the actuator with respect to the rotating media. A system controller is utilized to direct the operation of the low level media and actuator control circuits whereby the system controller specifies and adjusts, in real time, the incremental selection of the rotational position of the rotating media and the position of the actuator with respect to the rotating media. In the preferred embodiment of the present invention, the system controller is a programmable microcontroller operating in closed loop, event driven response to the occurrence of control information and data stored by the rotating media so that all essential operations required for the successful storage and retrieval of data with respect to the rotating media are performed concurrently and in real time by the microcontroller.

Thus, an advantage of the present invention is that the principal control operations required for the successful storage and retrieval of data with respect to the rotating media are centralized in a single microcontroller.

Another advantage of the present invention is that it permits the efficient architectural partitioning of the required control operations between minimal low level microcontroller support hardware and the control processes implemented by the microcontroller.

A further advantage of the present invention is that it permits the optional utilization of dedicated, well-defined high-level hardware to implement an interface control function, such as available for the implementation of a small computer systems interface (SCSI).

Still another advantage of the present invention is that it is continuously adaptable to the control characteristics of the rotating media and actuator over the life of the disk drive and when subject to dynamic operating environment changes.

A still further advantage of the present invention is that the centralization of the control processes required to support the storage and retrieval of data with respect to the rotating media increases the intrinsic reliability of the system while decreasing its hardware component count and all associated cost factors of significance.

BRIEF DESCRIPTION OF THE DRAWINGS

These and other attendant advantages and features of the present invention will become apparent and readily appreciated as the same becomes better understood by reference to the following detailed description of the invention when considered in conjunction with the accompanying drawings, in which like reference numerals designate like parts throughout the figures thereof, and wherein:

FIGS. 2a–e present a diagrammatic explosion of the format and constituency of a track sector in accordance with a preferred embodiment of the present invention;

DETAILED DESCRIPTION OF THE INVENTION

I. System Overview

Figure 1:
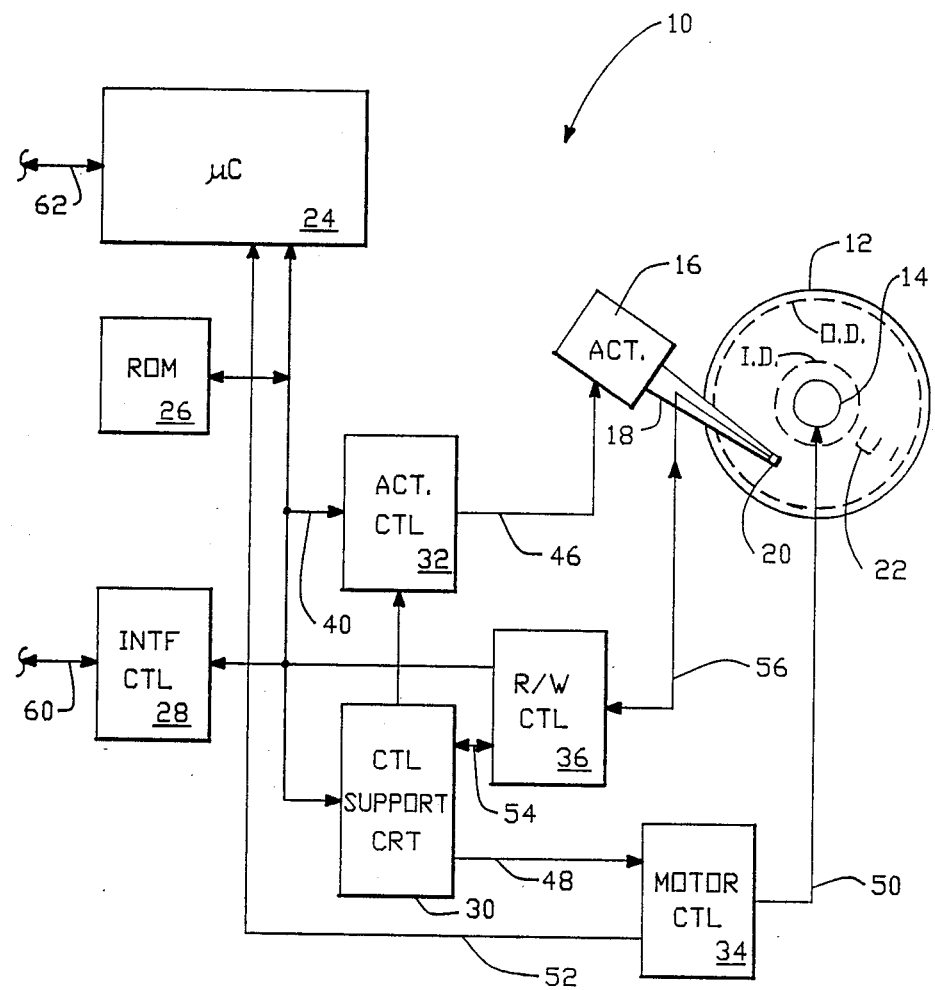
FIG. 1 is a simplified block diagram of the control system and its relationship to the actuator and rotating media in accordance with a preferred embodiment of the present invention.

A disk drive system controller, generally indicated by the reference numeral 10 and having a system control architecture consistent with the principals of the present invention, is shown in FIG. 1. The preferred embodiments of the present invention utilize the system controller 10 to operate a rotating data storage media, such as a plated magnetic disk 12, driven by a DC, commutatorless spin motor 14, and to control an actuator 16 for the proper positioning of an arm 18 and one or more heads 20 so that data may be written to or read from a selected concentric track provided on the magnetic surface of the disk 12 for the storage of data. The mechanical structure, mechanical support and electromechanical operation of the rotating media 12, DC spin motor 14 and actuator assembly 16, 18, 20 is described in detail in the related applications DISK DRIVE SOFTWARE SYSTEM ARCHITECTURE, ACTUATOR FOR DISK DRIVE and LATCH MECHANISM FOR DISK DRIVES noted above as related applications. These applications and the subject matter contained therein are hereby incorporated by reference. The distinctive mechanical and electromechanical aspects of the preferred embodiments of the present invention are the use of an essentially flat baseplate for the mounting of spin motor and actuator assemblies. The baseplate is flexibly attached to a faceplate. A cover encloses the baseplate and assemblies and is sealed to the faceplate. The spin motor assembly includes the spin motor 14 and one or more hard disk plates as the rotating media 12. The hard disk plates employ a plated magnetic layer on a 95 millimeter diameter substrate (a so-called 3.5 inch disk) to record concentric data tracks on both disk surfaces having, in alternate embodiments, 27 and 33 sectors per track to obtain data rates of eight and ten megabits per second, respectively at a disk spin speed of 3600 revolutions per minute. Each track sector is formatted to provide embedded servo information and a data storage capacity of 512 bytes of data. All of the disk surfaces are available for the recording of data due to the use of the embedded servo information. Using two to eight surfaces, formatted data storage capacities of 20 to over 100 megabytes can be readily achieved within a 3.5 inch, half-height form factor. Finally, due to the minimum rotating mass, and therefore reduced bearing friction, an efficient actuator voice coil driver and the minimal system controller electronics, the total power disapation of the preferred embodiments is less than about 7.7 watts, and typically about 5 watts.

The system controller 10, in the preferred embodiments of the present invention, performs all of the essential support processes necessary to permit an external host, typically a data processing system (not shown), to store and retrieve data from the rotating media 12. The central component of the system controller 10 is a microcontroller 24. In the preferred embodiments of the present invention, the microcontroller 24 is realized as a Motorola MC68HC11 HCMOS single chip microcomputer. This particular microcontroller 24 is described in the Motorola Semiconductor Technical Data Book for the MC68HC11A8 HCMOS single chip Microcomputer Technical Data Book (ADI 1207) available from Motorola, Incorporated, Motorola Literature Distribution, P.O. Box 20912, Phoenix, Ariz. 85036. A read only memory (ROM) 26, coupled to the microcontroller 24 by an address, data and control bus 40, is utilized to store a control program for the microcontroller 24. As will be described in greater detail below, this control program provides for the support of five principal tasks by the microcontroller 24. These tasks include interface, actuator, spin motor, read/write and monitor. An interface controller 28 is provided to support the microcontroller 24 in carrying out the interface task. The interface controller 28, in a preferred embodiment of the present invention, is an Adaptec AIC-500 SCSI interface controller chip manufactured and distributed by Adaptec, Incorporated and described in the AIC-500 SCSI Interface Controller Data Sheet number 50000X-00 available from Adaptec, Incorporated, 580 Cottonwood Drive, Milpitas, Calif. 95035. The interface controller 28, in general, is required to provide the hardware interface capability to support a communications bus 60 for the transfer of commands and data between the system controller 10 and the external host.

Hardware support of the actuator task of the microcontroller 24 is provided by the actuator controller 32. Directed by the microcontroller 24 through the provision of control signals and data via the address data and control bus 40, the actuator controller 32 drives the electromagnetic positioning voice coil of the actuator 16 by the selection of an appropriate voice coil current drive level provided to the actuator by lines 46. The spin motor task is supported in hardware by the motor controller 34. A preferred motor control circuit and the principles of its operation are disclosed in Method and Apparatus for Brushless DC Motor Speed Control, J. P. Squires, et al, Ser. No. 880,754, filed July 1, 1986, and is expressly incorporated by reference. In brief, the motor controller 34 provides for the generation of the multiphase DC motor commutation signals to the DC spin motor 14 via the motor winding drive lines 50. An analog feedback signal (SPIN SNS) is provided via line 52 to the microcontroller 24.

Finally, the read/write task is supported in hardware by a read/write controller 36. The principal functions of the read/write controller 36 are data buffering, encoding/decoding serialization, deserialization and data clock recovery. Serialized data is transferred to and from the read/write heads 20 of the actuator assembly 16, 18, 20 via data lines 56. The read/write controller 36 is controlled by and exchanges parallel data with the microcontroller 24 via the address, data and control bus 40.

Additional hardware support for the actuator controller 32, motor controller 34 and read/write controller 36 is provided by a control support circuit 30. The functions of the controller support circuit 30 are generally to process sector servo bursts and to provide latched control signals to the actuator, spin motor and read/write controllers 32, 34, 36 via control lines 44, 48, 54.

II. Sector-Data Storage Overview

Consistent with conventional disk drive data storage schemes, data is stored on the rotating media 12 of the present invention on concentric tracks centered about the spin axis of the media. Where there are multiple media surfaces for the recordation of data, data cylinders are defined as consisting of those tracks having a common spin radius. The tracks themselves are divided into track sectors defined as lying within a fixed radial arc. A portion of a single track is diagramed in FIG. 2a as a linear series of sectors. A single sector, $N_0$, is exploded in FIG. 2b to show its principal constituent data fields. In order, each sector, consistent with the present invention, is composed of a servo burst followed by a synchronization, or sync, field, a sector address header field, another sync field, a data field providing for the storage of typically 512 data bytes, and an error correction code (ECC) field. The ECC field is typically followed by an intersector gap extending to the beginning of the next sector's servo burst field.

A servo burst field is shown exploded into its constituent parts in FIG. 2c. The initial field is a servo sync field that serves to allow the microcontroller 24 to generally synchronize itself, in real time, to the servo burst field. Sector mark and grey code fields then follow in succession. The sector mark field is defined as a complete absence of servo data followed by a data transition. In the preferred embodiments of the present invention, the sector mark is represented as the first transition following the absence of any servo data for at least three servo sync clock cycles. By timing the period between detected sector marks, the rotational speed of the media 12 can be gauged quite accurately. The grey code field that immediately follows the sector mark is an FM encoded digital value representing the track or cylinder number of the sector currently under a head 20.

After a filler field, A/B Burst fields are provided. As diagrammatically shown, the A/B Burst fields are non-overlapping and are physically written on the media 12 offset from the center line of the track. In the preferred embodiment of the present invention, the A/B Burst fields are both written utilizing a constant frequency and head voltage amplitude. This permits any difference in the relative head voltage amplitude, upon each subsequent reading of the respective A/B Bursts to be utilized as an indicator of the position of the head 20 relative to the center line of the track. Finally, a filler sync field completes the servo burst field.

III. Microcontroller Software Architecture Overview

The control program provided in the ROM 26 enables the microcontroller 24 to support the complex and diverse processes of actuator control, spin motor control, read/write control and interface control, all in real time. The software architecture of the control program establishes the interface process as a foreground, or nominally executing, task. The execution of the interface task requires the microcontroller 24 to support the interface controller 28 in the performance of commands received from the external host and in the coordination of data transfers between the interface and read/write controllers 28, 36. The actuator, spin motor and read/write processes are supported as background tasks of nominally equal priority as between one another and higher priority with respect to the foreground interface task. The nominally equal priority of the background tasks is achieved by scheduling the execution of each of the tasks throughout the rotational period of each sector as generally shown in FIG. 2d. Where the actual sector period is not available, such as when the rotating media 12 is stopped or not rotating at full speed, a default sector period is used. A sector task, composed of subtasks including spin motor, read/write, and actuator tasks is initiated during the sector gap prior to the beginning of the servo burst of each sector. The subtasks of the sector task include commutating the spin motor 14, recognizing any new or pending messages from the interface process, and scheduling the initiation of actuator, spin motor and read/write process tasks during the current sector period. In preferred embodiments of the present invention, the actuator task is initiated by setting a timed interrupt to occur at about one-eighth of the duration of the sector period from the beginning of the current sector. At about the midpoint of the sector period, a second timed interrupt is set to occur to initiate the spin motor task. Finally, a timed interrupt to reinitiate the sector task will be set to occur during the sector gap at the end of the current sector period. The timing of this last timed interrupt is chosen to control the spin motor. Depending on whether there is a new or pending read/write operation requested by the interface task, either or both of the actuator and spin motor tasks will chain, in the preferred embodiments of the present invention, directly to the read/write task to perform any required read/write operation. The sector and read/write tasks, and the actuator and spin motor tasks if they do not chain respectively to the read/write task, will each end by the execution of a return-from-interrupt microcontroller instruction that will restore the interrupted foreground interface task to active execution. Consequently, essentially all of the available microcontroller processing capability is utilized in the performance of the processes necessary to implement the essential functions of the system controller 10.

There is no execution time wasted in the performance of task scheduling operations or other overhead functions as is typically required in conventional multi-tasking computer systems. Rather, the present invention achieves real time responsive, multi-tasking operation through time-based task scheduling of the sector, actuator, spin motor and read/write processes.

IV. Digital System Controller

Figure 3:
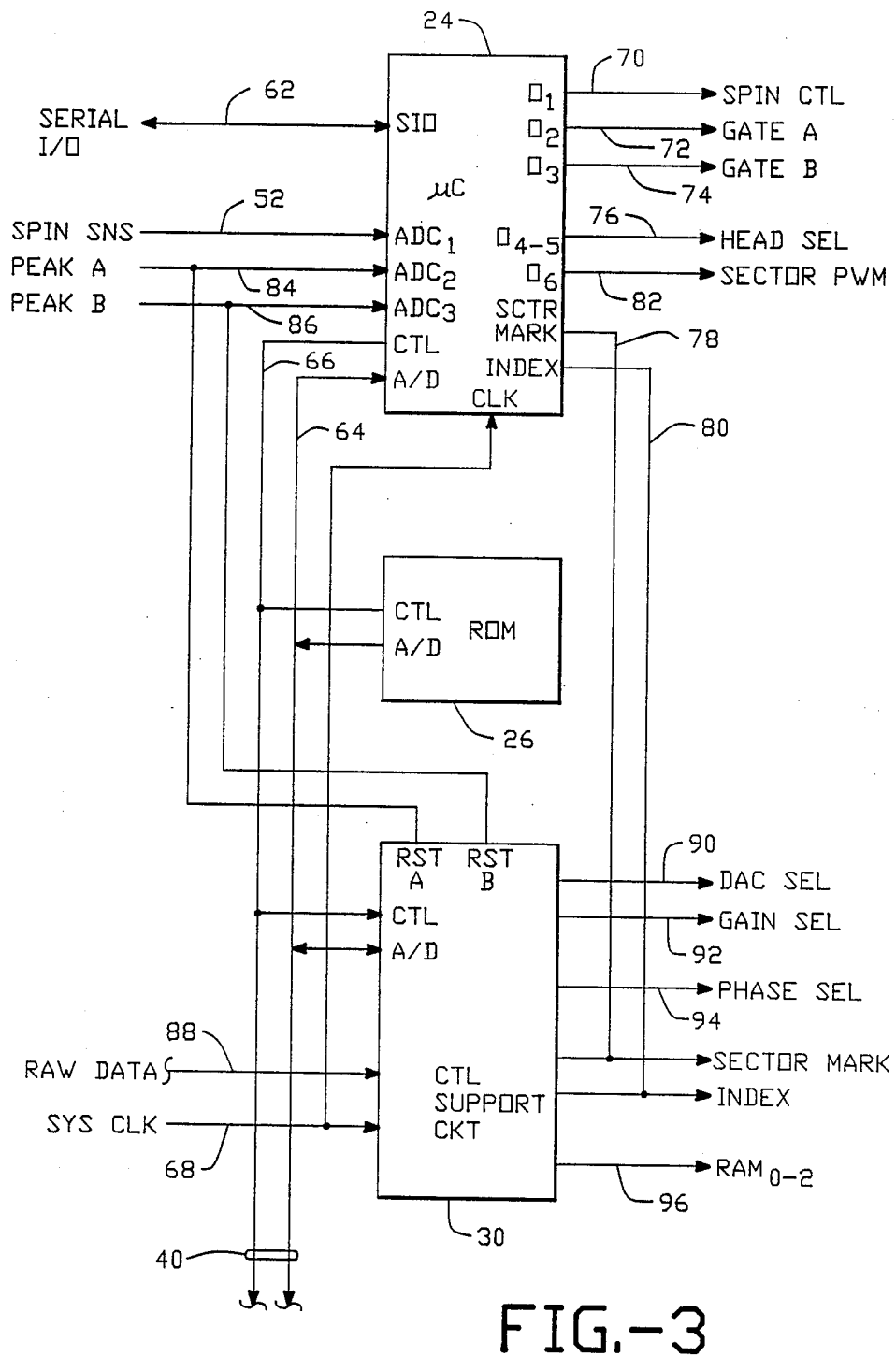
FIG. 3 provides a block diagram of the microcontroller controller and system support digital sections of the control system of the present invention.

Referring now to FIG. 3, the microcontroller 24 supports a multiplexed address and data bus 64 and a control bus 66 as its principal means of communicating to the various higher level components of the system controller 10. The buses 64, 66 also permit the microcontroller 24 to obtain its control program instructions and initialization data from the ROM 26. A system clock signal (SYS CLK) nominally running at 16 megahertz, is provided on a clock line 68. In order to monitor and control various other elements of the control system 10, the microcontroller 24 sources a spin control signal (SPIN CTL) via line 70 to the motor controller 34, Gate A and B signals on lines 72, 74 to enable the detection of the A/B Burst, and head selection signals via line 76 to select a specific one of the potentially multiple, typically four, read/write heads 20 for use in a current read or write operation. The microcontroller 24 will receive a sector mark signal via line 78 from the control support circuit 30 when a sector mark is physically detected from the rotating media 12. On recognition of a proper sector mark, the microcontroller 24 will source a read/write timing signal (Sector PWM), via line 82, to synchronize the read/write controller 36 with the current sector. If the sector for which the current sector mark is determined to be the index sector of the current track, the microcontroller 24 will provide an index signal via line 80 from the controller support circuit 30 for the duration of the current index sector period.

The microcontroller 24 receives the analog spin sense signal (SPIN SNS) via line 52 at an input of an internal analog-to-digital converter within the microcontroller 24. The spin sense signal is a voltage feedback signal indicative of a motor winding characteristic, such as current, provided by the motor controller 34. Other analog inputs of the internal analog to digital converter receive analog Peak A and Peak B signals via lines 84, 86. The Peak A and Peak B signals are indicative of the respective A and B burst amplitudes read from the A/B Burst Fields of the current sector.

The controller support circuit 30 is principally provided to perform low-level, high-speed functions that could not be conveniently performed directly by the microcontroller 24. These high-speed functions include detecting the occurrence of a sector mark and capturing the grey code value read from the grey code field of the current sector. Otherwise, the controller support circuit 30 operates as a simple latched output port expander for the microcontroller 24. The sector mark and grey code capture functions are driven by raw, clock separated data received from the read/write controller 36. The controller support circuit 30, functioning as a latched output port for the microcontroller 24, provides actuator enable and actuator gain select signals, via lines 90, 92 to the actuator controller 32. Similarly, commutation phase select signals are provided, via line 94, to the motor controller 34 and ram bank select signals, via lines 96, are provided to the read/write controller 36.

Figure 4:
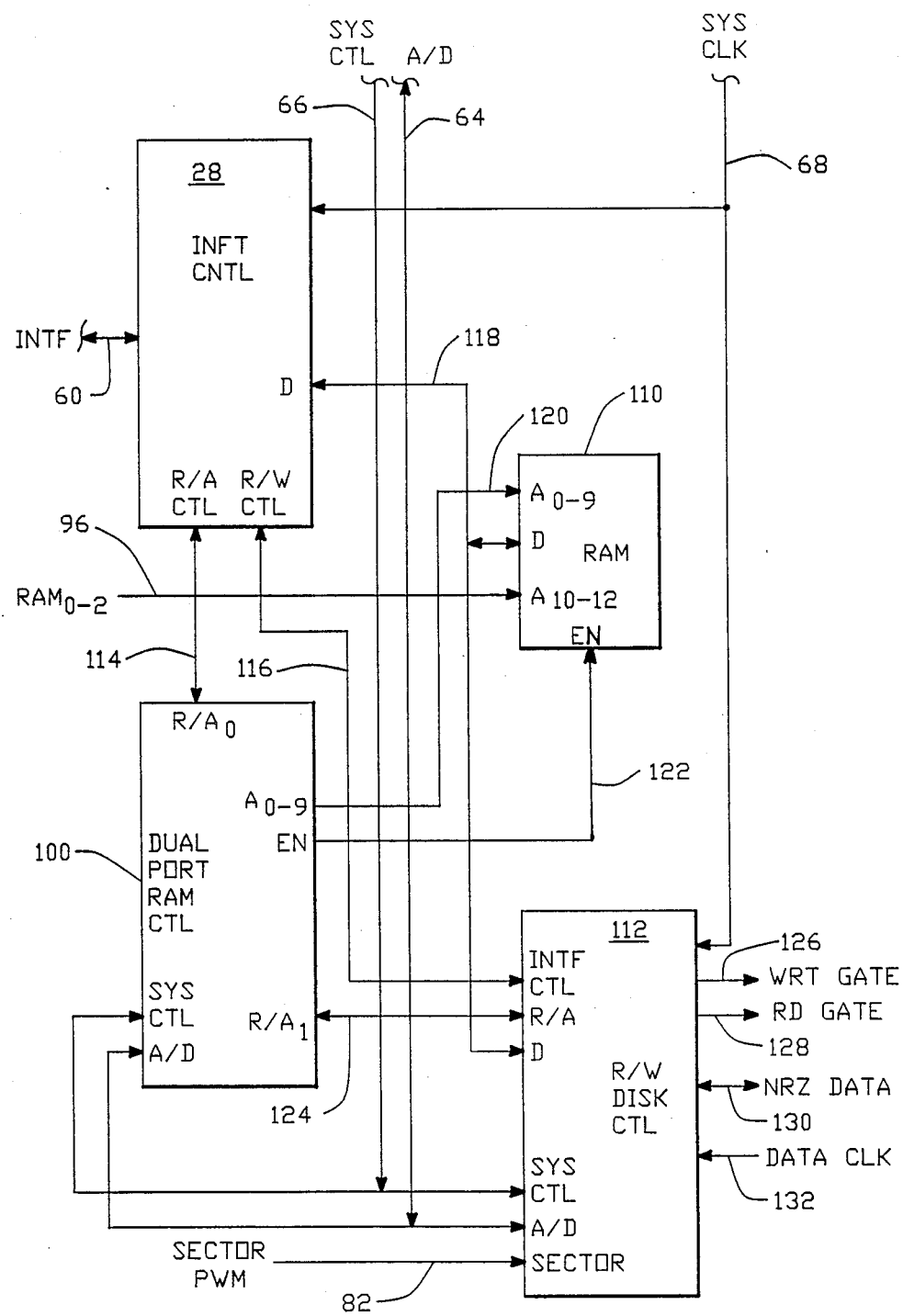
FIG. 4 provides a block diagram of the interface and digital control and data buffering section of the read-/write controller of the present invention.

The interface controller 28 and the control and data buffering portion of the read/write controller 36 are shown in FIG. 4. The dual port ram controller 100 and the read/write disk controller 112 are preferably the Adaptec AIC-300 Dual Port Buffer Controller and the Adaptec AIC-010 Winchester Controller Chips, both also available from Adaptec, Incorporated. The buffer function itself is performed by a random access memory (RAM) device 110. In the preferred embodiments of the present invention, the RAM 110 is a static 64 kilobit, single CMOS memory chip organized as 8K. by 8 bit.

The interface controller 28 implements at least the common core of the high-level SCSI protocols, thereby permitting the host to communicate with the system controller via a standard SCSI bus. Alternately, the interface controller 28 may implement the buffering control logic necessary to permit connection to a conventional "AT" type peripheral interface connector.

The disk controller 112 implements the control logic needed to support a low-level data channel circuit 300 (shown and described below with respect to FIG. 9) that completes the read/write controller 36. Read and Write Gate signals, enabled in timed response to the receipt of the sector PWM signal from the microcontroller 24, are provided via lines 126, 128 to enable respective raw data read and write operations. Non-return-to-zero (NRZ) data is bidirectionally exchanged with the data channel circuit 300 via data line 130. A data direction sensitive data clock signal (DATA CLK) is provided to the disk controller 112 via a data clock line 132. This data clock signal, as generated by the data channel circuit 300, is specifically synchronized to the raw data as read or written with respect to the rotating media 12.

The dual port RAM controller 100 coordinates all memory accesses of the RAM 110. Requests for RAM access are placed by the interface controller 28 via the request/acknowledge ($R/A_0$) control lines 114 and by the disk controller 112 via the separate request/acknowledge ($R/A_1$) control lines 124 to the dual port RAM controller 100. Data transfers between the interface controller 28, the RAM 110 and the disk controller 112 occur over a dedicated data bus 118. RAM addresses and transfer enable control signals are generated by the dual port RAM controller 100 and provided to the RAM 110 via the address lines 120 and the enable control lines 122. High-order RAM addresses, acting as memory bank select signals, are provided to the RAM 110 from the controller support circuit 30 via address lines 96. All accesses by the microcontroller 24 to the RAM 110 are through the disk controller 112.

The primary flows of data occurring ultimately between the external host and read/write heads 20 are buffered through the RAM 110. Typically, a command or request for the transfer of data will be placed by the external host to the interface controller 28 via the interface bus 60. The interface controller 28, performing the necessary hardware and software protocol handshaking to receive the command request, will place a formatted command request in a reserved portion of the RAM buffer 110. If data is being provided by the external host, the interface controller 28 will also provide for the transfer and storage of the received data into a buffer section of the RAM 110. The disk controller 112 is alerted to the presence of the pending command request by the interface controller 28 by the read/write control lines 116. The microcontroller 24 may monitor the state of the read/write control lines 116 by periodically interrogating an internal register of the disk controller 112 via the control and address data buses 66, 64.

To implement a pending command/request, the microcontroller 24 will access the RAM 110 via the disk controller 112 and dual port controller 110 to determine the nature of the command and whether the command may be honored. If honorable, the microcontroller 24 implements the command by programming and enabling the disk controller 112. If the command involves data provided by the external host to be transferred to the rotating media 12, the disk controller 112 is programmed by the microcontroller 24 as to the storage destination of the data and the quantity of data transfer. The disk controller 112 then obtains the data directly from the RAM 110, serializes the data and ultimately provides the data to the data channel circuit 248 via the NRZ data line 130.

If, however, the command request placed by the external host is for the transfer of the data from the rotating media 12, the microcontroller 24, again in response to the formatted command placed by the interface controller 28 in the RAM 110, will program the disk controller 112 to obtain the requested information from the sectors of the rotating media 12 specified by the command. When enabled, the disk controller will receive the data via the NRZ data line 130 and transfer the data into the buffer section of the RAM 110. On completion of the data transfer, or some unit portion thereof, the disk controller 112 will notify the interface controller 28 of the availability of the requested data by a signal placed via the read/write control lines 116. The interface controller 28 will then initiate the hardware handshaking or software protocol signalling necessary to alert the external host of the availability of the requested data. On acknowledgement by the host, the interface controller 28, will transfer the buffered data from the RAM 110 to the interface bus 60.

A, The Microcontroller

Figure 5:
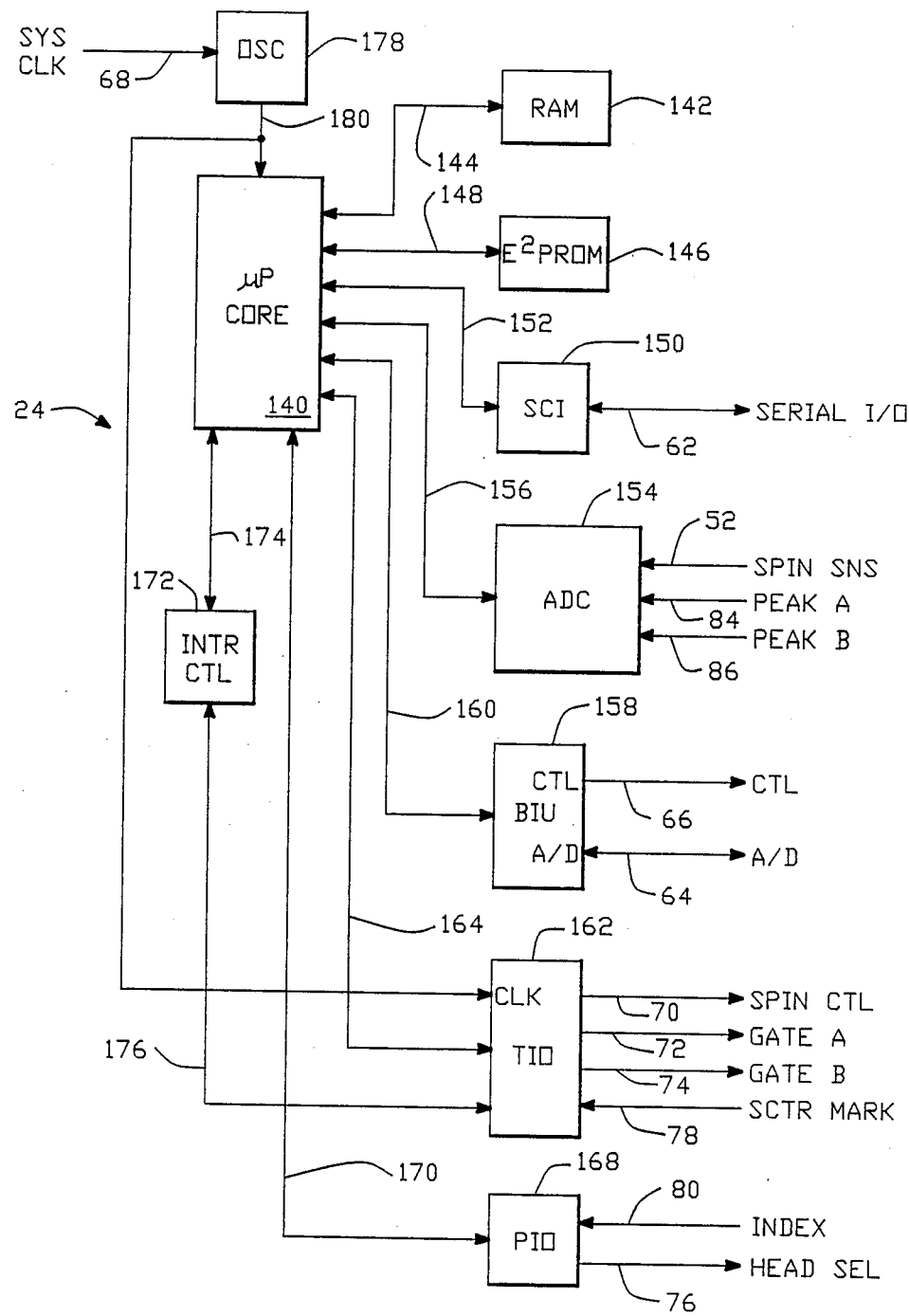
FIG. 5 is a detailed block diagram of the microcontroller preferred for use in conjunction with the present invention.

FIG. 5 provides a detailed block diagram of the sub elements of the microcontroller 24. Central to the microcontroller 24 is a microprocessor core component 140 that implements the standard functions of a conventional microcomputer, such as the Motorola 6800 family of microcomputers. The microprocessor core 140 is, however, extended to support its various on-chip peripheral devices. These peripheral devices include a 256 byte block of RAM memory 142 selectable as a source or destination of data by the microprocessor core 140 via control lines 144. An electrically erasable programmable read-only memory (EEPROM) 146, having a capacity of 512 bytes of data is accessible by the microprocessor core 140 for reading and writing (programming) via control lines 148. A serial communications interface (SCI) 150 is provided to and from support a standard asynchronous serial input/output bus 62 and thereby establish a communications route to the system controller 10 independent of the host interface bus 60. The aforementioned analog-to-digital conversion capability is realized as an analog-to-digital converter (ADC) 154 having an integral multiplexed input controlled by the microprocessor core 140 via control lines 156 to permit the separate receipt of the SPIN SNS, PEAK A and PEAK B analog signals via respective analog multiplexer input lines 52, 84, 86. A bus interface unit (BIU) 158, controlled from the microprocessor core 140 via control lines 160, is provided to support the multiplexed address and data bus 64 and to supply the system control signals in support thereof via the control bus 66. A timer input/output (TIO) unit 162, controlled by the microcontroller core 140 via control lines 164, provides a bank of digital timers. For purposes of the present invention, three such digital timers are utilized to provide for the programmatically timed generation of the spin control, GATE A and GATE B signals on line 70, 72, 74. A fourth counter of the TIO 162 receives the sector mark signal as generated by the controller support circuit 30 via lines 78 to permit the accurate timing of sector periods. A parallel input/output (PIO) unit 168 is utilized as a latched output port to provide the head select signals via lines 76 and to receive, as an input, the index signal, indicating whether the current sector is the index sector of the current track. The function of the PIO 168 is controlled by the microprocessor core 140 via the control lines 170. The final programmatically controlled unit of the microcontroller 24 is an interrupt controller 172. The various counters of the TIO 162 generate respective interrupts when they reach a programmatically defined count value. These interrupts are respectively directed to the interrupt controller 172 via interrupt lines 176. The microprocessor core 140 is immediately called via interrupt controller lines 174, to service the interrupting event as identified by the respective interrupt that occurs. Finally, an on-chip oscillator 178 is provided to generate the internal timing signals required by the microprocessor core 140 and the TIO unit 162. The oscillator 178 receives the system clock signal via clock line 68 and, in turn, generates a microcontroller internal clock signal that is provided via internal clock line 180. Although not shown, the microcontroller 24 communicates with each of its on-chip addressable peripheral devices by way of an internal data bus.

B. Controller Support Circuit

Figure 6:
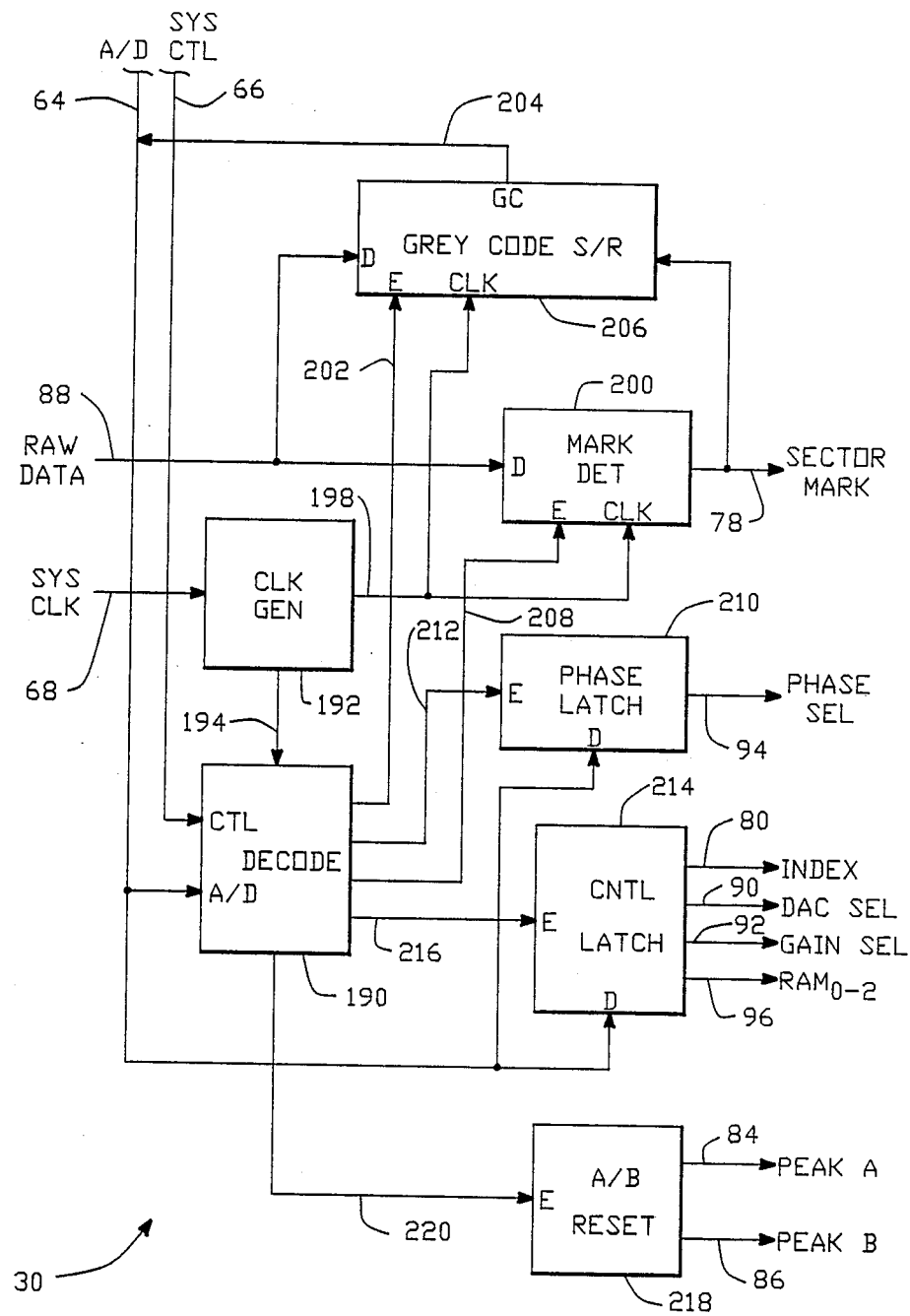
FIG. 6 is a detailed block diagram of the general system support digital hardware as implemented for a preferred embodiment of the present invention.

FIG. 6 provides a detailed block diagram of the minimal controller support hardware required by the present invention as realized in the controller support circuit 30. The microcontroller 24 programmatically accesses and controls the controller support circuit 30 via a decoder 190 coupled to the address and data and control buses 64, 66. A clock generator 192, driven by the system clock signal provided via clock line 68, synchronizes all operations of the decoder 190 by the provision of an internal clock signal via clock line 194 to the decoder 190. A sector mark detection circuit 200 is provided within the controller support circuit to perform the actual task of detecting the occurrence, in real time, of a sector mark. For this purpose, the mark detector circuit 200 receives the raw, clock separated, data signal provided from the low level data channel circuit 300 via the raw data input line 88 and a date clock counting signal from the clock generator 192 via clock line 198. The microcontroller 24 enables the mark detector 200 by accessing the decoder 190 to provide a search enable signal on line 203 and thereby initiate the beginning of a mark search. The mark detector circuit 200 fundamentally implements a clocked serial shift register circuit to that provides a signal on finding three successive data clock periods where there are no corresponding raw data transitions. Immediately on detecting the occurrence of such a circumstance, the mark detection circuit generates a sector mark pulse that is provided to the microcontroller 24 via the sector mark signal line 78. The mark detector circuit then goes inactive until enabled for the next sector mark search.

A grey code shift register is provided within the controller support circuit 30 to capture the grey code value as it is read from the grey code field. Generally, the grey code shift register is enabled by the microcontroller 24 at the same time that it initiates a sector mark search operation. However, for purposes of flexibility, the grey code shift register receives a separate enable signal from the decoder 190 via enable line 202. The grey code shift register 206 also receives the raw data from data line 88 and data clock signal from clock line 198 in parallel with the mark detector circuit 200. The grey code shift register 206 receives the sector mark signal from the mark detector circuit 200 to initiate with the very next clock period the acquisition of the raw data from the raw data line 88. Fundamentally, the grey code shift register implements a serial-to-parallel shift register function. The serial-to-parallel conversion is halted sixteen data clock cycles after being enabled in response to the sector mark signal. That is, the grey code is realized as a two byte value identifying the current read/write cylinder. In the preferred embodiments, only 10 bits of the grey code are utilized, with successive cylinders being assigned grey code values successively differing by only one bit. The two bytes of the grey code value are then available on the grey code parallel output bus 204 to the address/data bus 64 in response to respective output enable control signals from the decoder 190 via control lines 202. Thus, the controller support circuit performs the mark detection and grey code acquisition operation substantially unattended by the microcontroller 24, though requiring a minimum of hardware.

A phase latch 210 is provided in the controller support circuit 30 to support the spin motor controller 34. The phase latch 210 functions essentially as a digital latch for storing the phase winding value corresponding to the particular phase windings to be currently selected by the spin motor controller 34. The phase latch receives the phase value from the data bus portion of the address in data bus 64 on receipt of an enable signal from the decoder 190 via an enable control line 212. The latched phase value is then immediately provided on the phase selection output lines 48.

A digital control signal latch 214 is similarly provided to support the actuator and read/write controllers 32, 36. A control word is written to the control signal latch 214 via the data bus portion of the address and data bus 64. The control word is latched by the control signal latch 214 on receipt of a latch enable signal from the decoder 190 via control line 216. The respective bits of the control word stored by the control signal latch are provided onto the index, actuator DAC select, gain select and RAM bank select control lines 80, 90, 92, 96.

Finally, an A/B reset circuit 218 is provided generally in support of the read/write controller 36. The A/B reset circuit 218 implements unlatched, open collector drivers that operate in response to a control signal from the decoder 190 via the control line 220. The outputs of the open collectors of the A/B reset circuit 218 are coupled to the analog signal lines PEAK A and PEAK B 84, 86.

V. Actuator Controller

Figure 7:
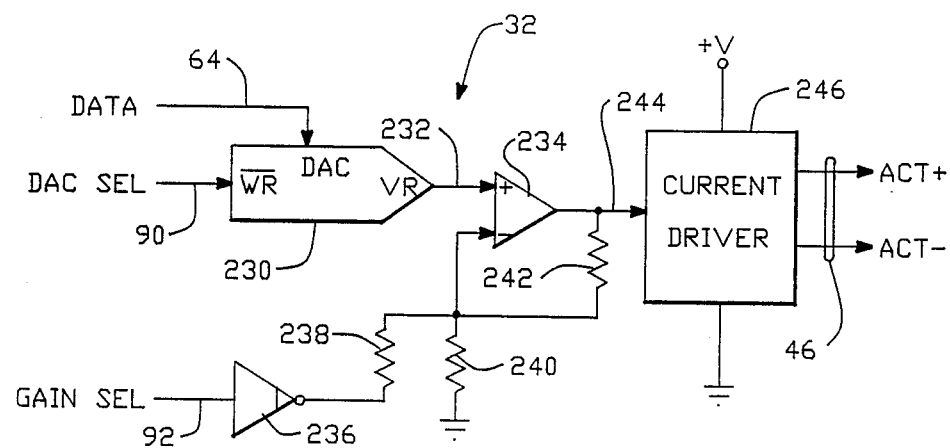
FIG. 7 is a schematic block diagram of a digital to analog converter/current driver circuit for controlling and adjusting the position of the actuator in accordance with the present invention.

The actuator controller 32 is shown in FIG. 7 in block diagram form. As disclosed in the above-identified application, Actuator for Disk Drive, the preferred actuator for use in conjunction with the present invention utilizes a voice coil driver permitting continuous selection of the pivotal position of the actuator arm 18 and heads 20. In the preferred embodiments of the present invention, the actuator controller 32 utilizes an eight-bit latched-input digital-to-analog converter 230 to generate an analog voltage value proportional to the desired actuator position. The latched inputs of the digital-to-analog converter 230 are enabled and then latched in response to the actuator DAC select signal as provided on the DAC select line 90. A digital output value, as determined by the microcontroller 24 is provided via the data bus portion of the address/data bus 64 to the digital-to-analog converter 230 for latching and conversion. The resulting analog output signal is provided via the DAC output line 232 to the plus input of an operational amplifier 234 configured by the connection of resistors 240, 242 as a non-inverting amplifier having a gain value of approximately 2. The output of the operational amplifier 234 is provided via line 244 to a voltage following current driver circuit 246. Differential output lines 46 from the current driver 246 are connected to the two terminals of the actuator voice coil. The current driver 246 provides for a differential current on the lines 46 proportional to the voltage value at the output of the operational amplifier 234.

Since, in the preferred embodiment of the present invention, the data bus portion of the address/data bus 64 has a width of 8 bits, the resolution range of the digital-to-analog converter 230 and, therefore the current driver 246, is limited to 256. However, the actuator controller 32 is required to support two substantially different actuator related operations. These operations are seeking and track following. The seeking operation involves rapidly moving the heads 20 from one track of the rotating media 12 to a substantially different track. Seeking over any extended number of tracks optimally requires the application of very large current values to the actuator voice coil to minimize the total seek time. Conversely, the track following operation ideally involves very minute changes in the voice coil current as needed to closely follow a single track. Accordingly, the microcontroller 24 provides a gain select signal to the actuator controller 32 via gain select line 92 to alter, preferably by a factor of 4, the total range of obtainable voice coil currents. The gain select signal is provided to a open collector buffer 236 connected through a resistor 238 to the negative input of the operational amplifier 234. Consequently, the microcontroller 24 is capable of directly altering the gain factor of the operational amplifier 234 between fixed gain factors with a concurrent realization of a proportional increase in the range of selectable current values.

VI. Spin Motor Controller

Figure 8:
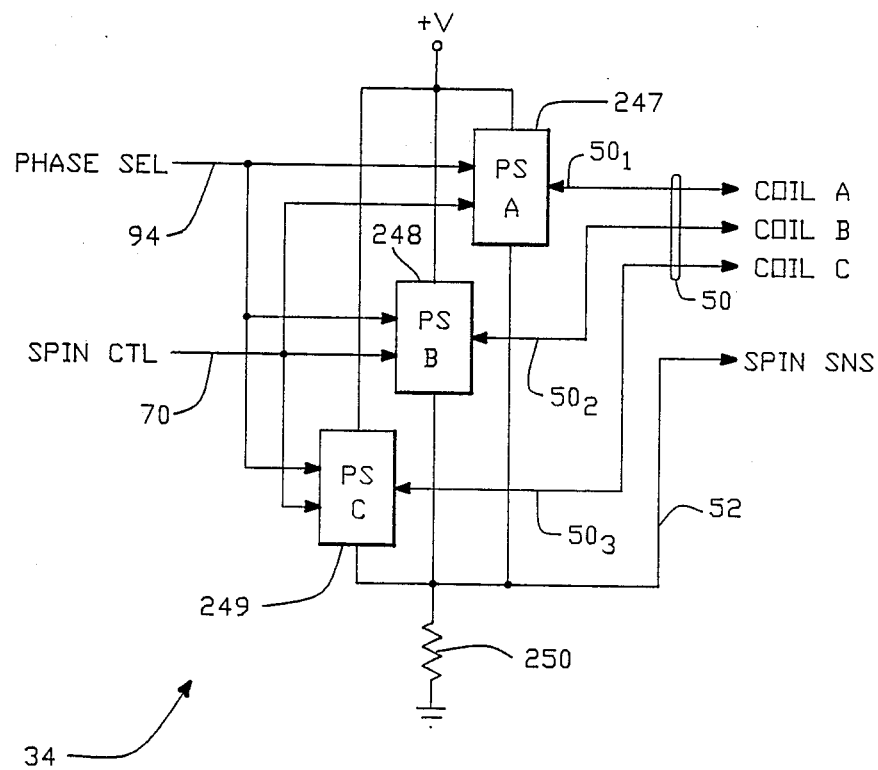
FIG. 8 is a block diagram of the motor control circuit utilized to select and adjust the rotational position of the rotating media in accordance with the present invention.

Referring now to FIG. 8, a block diagram of the motor controller 34 is shown. In the preferred embodiment of the present invention, the motor 14 is a DC three phase commutatorless motor. The three commutation nodes of the phase coils, designated as nodes a, b, c, are driven by respective phase switches 247, 248, 249. The phase switches 247, 248, 249 are selectable to operate either as a current source, drawing current from a positive voltage supply, or as a current sink, with the current load being passed through the reference resistor 250. The voltage value of the SPIN SNS signal on line 52 is, therefore, directly proportional to the motor winding current level passing through the reference resistor 250. The phase select signal as provided by the phase latch 210 via the phase select control lines 94 determines whether the respective phase switches 247, 248, 249 are sourcing current, sinking current or set to a high output-impedance state on their output lines $50_1$, $50_2$, $50_3$. The switches 247, 248, 249 also receive the spin control signal, in common, via control line 70. The spin control signal either enables the phase switches 247, 248, 249 to be responsive to the phase select value provided on the phase select lines 94 or to be commonly disabled such that they each present a high output-impedance to the nodes a, b, c via coil winding lines $50_1$, $50_2$, $50_3$.

VII. Read/Write Controller Data Channel Circuit

Figure 9:
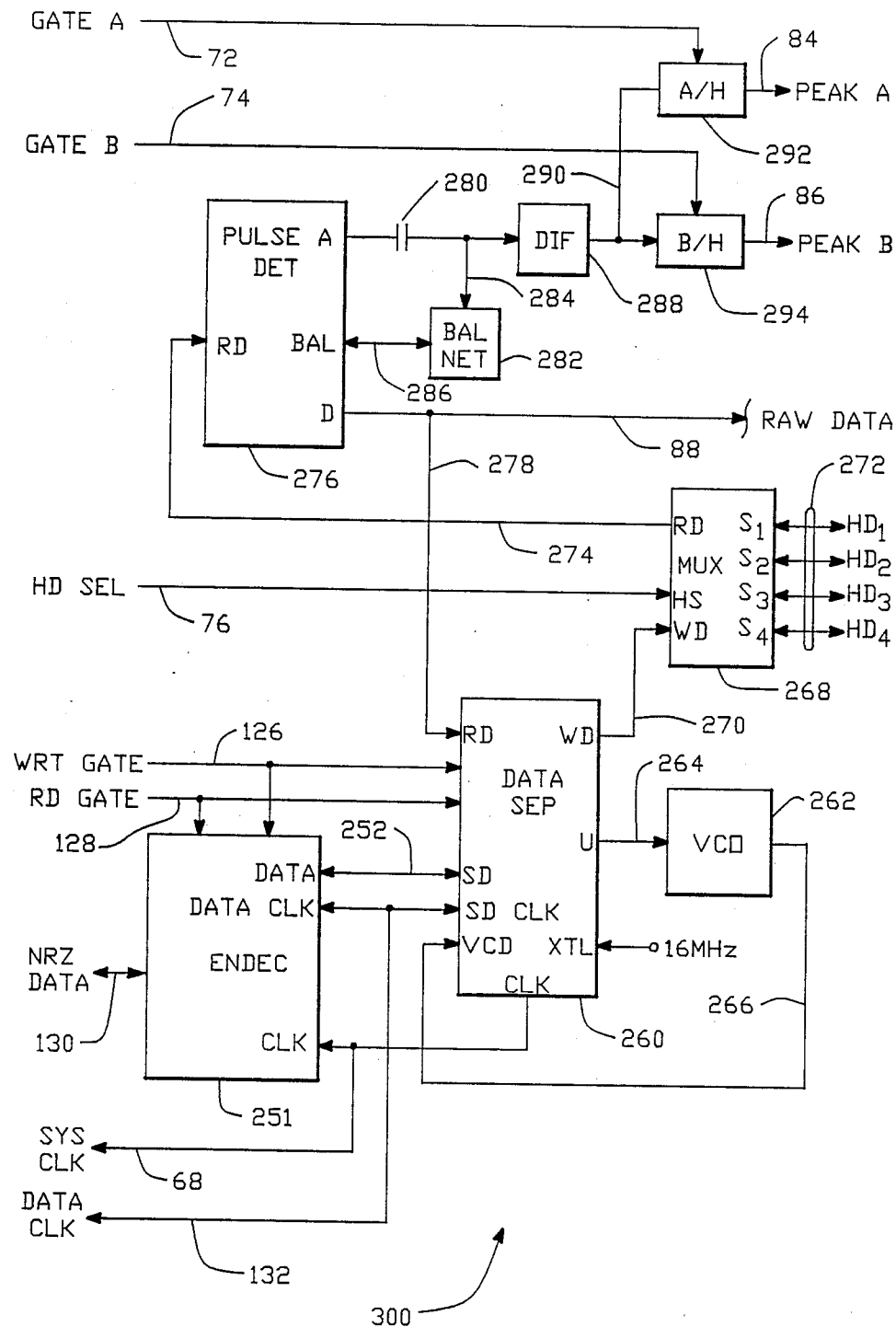
FIG. 9 is a detailed block diagram of the data channel circuitry utilized in a preferred embodiment of the present invention.

The low level data channel circuit 300, as shown in FIG. 9, supports the bidirectional transfer of data to and from the individual heads 20 of the actuator subassembly 16, 18, 20. In brief, the write data path for data being written to the rotating media is through an ENDEC 251 where the serial data is encoded, to a data separator 260 where the encoded data is combined with the data clock signal, and finally to a multiplexor 268 for routing to a specific head 20.

Similarly, the read data path begins with data, originating from a specific one of the heads, being selected for transfer to a pulse detector 276 for initial wave form shaping, to the data separator 260 for extraction of the read data clock signal and finally back to the ENDEC 251 for decoding back into NRZ data before being provided to the disk controller 112.

In greater detail, the ENDEC (preferably an AIC-270 2,7 RLL Encoder/Decoder available from Adaptec, Inc.) is responsive to the write and read gate signals generated by the disk controller 112 and provided via the control lines 126, 128. On receipt of the write gate signal, the ENDEC 251 begins converting NRZ data received from the disk controller 112 via NRZ data line 130 to a 2,7 RLL data format. The encoded data is then provided to the data separator 260. The data separator utilized in the preferred embodiments of the present invention is a conventionally constructed application specific integrated circuit (ASIC) utilizing the macro function libraries of Ferranti, Inc. (address). The ASIC data separator 260 and the voltage controlled oscillator (VCO) 262, together, are functionally equivalent to the National Semiconductor NS8462 Data Separator and a conventional crystal controlled clock generator. The VCO 262 is preferably a discrete component voltage controlled oscillator, utilizing a charge pump to convert the input digital clock stream to a VCO control level, of conventional design. The use of a discrete component VCO design was chosen over the use of the VCO internal to the NS8462 to permit a perceived greater control over the VCO's jitter tolerance specification. Another reason for choosing to use the ASIC data separator 260 was that it allowed pre-compensation to be used; pre-compensation is a conventional feature of disk drive data separators that is not available with the NS8462. Finally, the use of the ASIC data separator 262 allows a conventional 16 MHz crystal controlled clock generator to be placed on-chip. Since the NS8462 does not itself provide a clock generator function, an external, though conventional, clock generator would be needed.

The data separator 260 drives a 16 megahertz crystal to generate a controlled clock signal that is provided to the ENDEC 251 and the control system 10 in general via the system clock line system 68. The data separator 260 also provides the same system clock signal to its separated data (SD) clock line output and onto the data clock lines 132 in response to the write gate signal. The data separator 260 receives both the write and read gate signals via control lines 126, 128. The data clock signal is used by the ENDEC 251 as the basis for clocking encoded data from the ENDEC 251 to the data separator via the data line 252. The encoded data from the ENDEC 251 is combined with the data clock signal and provided to the multiplexor 268 via the write data line 270. The multiplexor 268 also receives the head select control signals provided by the microcontroller 24 on select lines 76. In response, the multiplexor 268 routes the write data from the data separator 260 to a head select value corresponding one of the head data lines 272.

The reading of data from the rotating media 12 must serve two different but related purposes. The first, naturally, is reading the servo burst information from the beginning of every sector independent of whether a read write, or other data operation is to occur. The reading of a servo burst is largely controlled by the microcontroller 24. Again responsive to the head select value provided on the head select control lines 76, the multiplexor 268 routes data read from a specific head 20 and its corresponding head data line 272 to the multiplexor read data output line 274. The multiplexor 268, in addition to performing its signal multiplexor function, further performs as a conventional pre-amplifier for the data received from any of the head data lines 272. The amplified read data is then received by the pulse detector 276 (preferably a National Semiconductor NS8464 Pulse Detector, manufactured and distributed by National Semiconductor Corporation, 2900 Semiconductor Drive, Santa Clara, Calif. 90501 and described in the Advanced Peripheral Processor Solution Handbook No. 1: Mass Storage National Semiconductor, 1986). After further amplification, the read data is passed from an analog output, A, of the pulse detector 276 through a DC blocking capacitor 280, preferably having a value of 0.01 microfarads, to a balanced network 282 via analog line 284. The balanced network 282, with the exception of the capacitor 280, is a conventional implementation of the required analog waveform shaping circuitry intended and suggested for use with the pulse detector 276. The shaped analog signal is provided back to the pulse detector via analog line 286 for further analog signal processing and ultimate conversion to a digital serial data stream. The processed, digital version of the read data is then provided onto the raw data output line 88 from the pulse detector 276. This raw data is utilized by the controller support circuit 30 for synchronization, detection of the sector mark and for the extraction of the grey code.

The analog data stream passed through the capacitor 280 is also provided to a differentiator 288 before being provided to peak detector and hold circuits (peak hold) 292, 294 via analog lines 290. The peak hold circuits 292, 294 provide for the capture of the peak analog value of the differentiated data signal as provided on line 290. The peak hold circuits 292, 294 are respectively enabled by the Gate A and Gate B signals, as provided on the Gate A and B control lines 72, 74 by the microcontroller 24. Under the control of the microcontroller 24, the peak hold circuits 292 and 294 are enabled for the respective durations of the A and B bursts. The resulting Peak A and Peak B analog signals are provided by the peak hold circuits 292, 294 on the Peak A and Peak B analog lines 84, 86 to the microcontroller 24. After conversion of the Peak A and Peak B analog signals, the microcontroller 24 may clear the peak hold circuits 292, 294 by temporarily shorting their outputs to ground in response to the operation of the A/B reset circuit 218 of the controller support circuit 30. Consequently, the analog peak value held by the peak hold circuits 292 and 294 will be reset to zero.

Figure 10A:
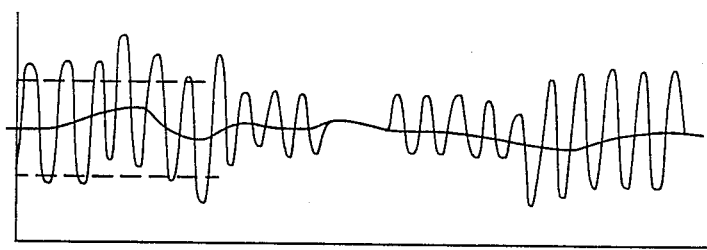
FIGS. 10a–c are successively processed raw data waveforms associated with an A/B burst.

Referring now to FIG. 10a, an exemplary analog wave form as might be received from the pulse detector on analog output line 272 is shown. The particular section of the servo burst shown graphically illustrates an A/B burst. A portion of filler sync just prior to the A burst illustrates, by its peak variation, the occurrence of dropout. That is, as a result of variations in the raw analog data received by the pulse detector, the analog wave form may carry a fluctuation DC bias of sufficient magnitude that sync waveform peaks fail to surpass their intended minimum threshold values. A consequence of such an error is that the balanced network 282 will be improperly perturbed. This source of signal fluctuation may in turn lead to errors during the reading of the A/B Bursts, as well as with respect to other fields including the address header and date fields. In accordance with the present invention, the capacitor 282 is introduced into the analog signal path at the analog output of the pulse detector 276 to effectively remove the DC bias and thereby suppress the occurrence of dropout.

Figure 10B:
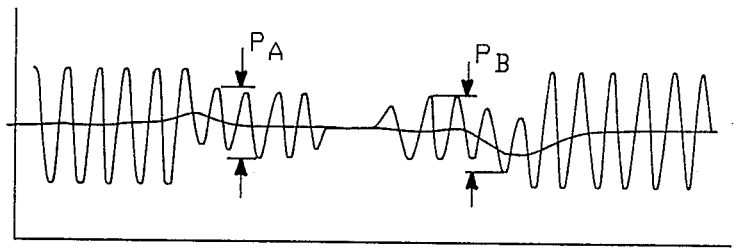

FIG. 10b illustrates the same portion of the analog data stream as shown in FIG. 10a, but as DC filtered and present on the analog data line 284. The preferred embodiments of the present invention utilize extremely short A/B bursts in order to maximize the portion of the linear track length available for other purposes, specifically including the storage of data. Accordingly, the duration of the respective A and B burst fields is constrained to a nominal 4 microseconds as opposed to a more conventional 30 microseconds. A consequence of utilizing such a short A/B burst period is that a significant amount of baseline drift, arises as a result of the slew between the high amplitude filler sync signal and the much lesser amplitude of the A/B burst signal. By including a baseline drift perturbed portion of the burst signal within the Gate A and Gate B enabled peak hold periods, false peak amplitude values, generally corresponding to the peak amplitudes indicated as $P_a$, $P_b$, will be captured by the peak hold circuits 292, 294 and ultimately received by the microcontroller 24. Since the A/B burst values are utilized to determine the relative position of the head with respect to the center line of the track, errors in measuring the A/B bursts will directly correspond to an increased data error rate due to mispositioning of the heads relative to a track center line.

Figure 10C:
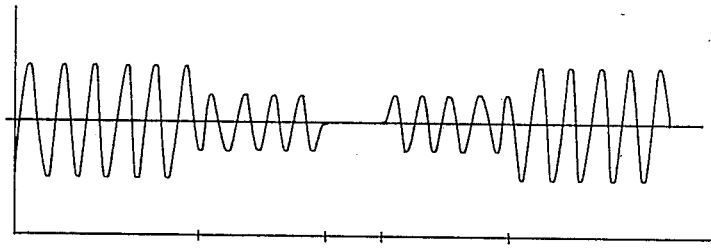

The differentiator 288 is provided in the preferred embodiments of the present invention to reduce, if not eliminate, the effect of baseline drift on the peak capture accuracy of the peak hold circuits 292, 294. The differentiator 288 is realized as an emitter follower configured bipolar transistor in the analog signal path between the analog line 284 and the analog line 290. A single pole high-pass filter is coupled to the emitter terminal of the emitter follower to implement the differentiator function. In the preferred embodiments, the filler sync and A/B signal frequency is approximately 2 megahertz. The differentiator high-pass pole is placed at about 9 megahertz to provide an adequate degree of differentiation of the A/B burst analog signals. The resultant signal provided to the inputs of the A/B burst peak hold circuits 292, 294 is shown in FIG. 10c. As shown, the peaks of each cycle of the respective A/B bursts are essentially constant as a direct consequence of the removal of any perturbing effect due to baseline drift.

Referring again to FIG. 9, the second principal read function performed by the data channel circuit 300 is to read data from the address header, data and ECC fields of data sectors. In response to the read gate signal as provided from the disk controller 112 via read gate control line 128, the data separator 260 begins providing separated data and its corresponding synchronized data clock signal to the ENDEC 251. To support this, the data separator 260 drives a voltage controlled oscillator (VCO) 262 with the error output of a phase lock loop synchronized to the digital raw data from line 278. The VCO output is fed back via line 266 to the data separator 260. The resultant data clock signal, effectively separated from the digital raw data and synchronized to the data being provided via line 252, is gated onto the data clock line 132. The ENDEC 251 receives the separated data and synchronized data clock signal and decodes the data to provide NRZ data to the disk controller 112 via the NRZ data line 130.

VIII. SUMMARY

Thus, a highly efficient system architecture for the real time control and management of a rotating media type data storage peripheral has been disclosed.

Clearly, many modifications and variations of the present invention are possible in light of the above teachings. Therefore, it is to be understood, that within the scope of the appended claims, the principles of the present invention may be realized in embodiments other than as specifically described herein.

What is claimed is:

1. A disk drive architecture providing for the controlled storage and transfer of data with respect to a host, said architecture comprising:
   (a) a disk for storing data in respective sectors at a surface of said disk, each sector including sector information;
   (b) means for rotating said disk in response to spin signals that determine the direction and rotational rate of said disk, said rotating means including means, responsive to spin data values, for providing said spin signals to said rotating means;
   (c) means for positioning a head with respect to the surface of said disk for reading and writing data, said positioning means including actuator means, responsive to a positioning signal, for moving said head with respect to the surface of said disk and means for converting an actuator data value into said positioning signal;
   (d) sector means, coupled to said head, for recovering sector information from the sectors on the surface of said disk, said sector means including means for converting said sector information to sector data values including a sector mark signal; and
   (e) a microcontroller for successively executing a plurality of control processes including sector, spin, and actuator control processes, wherein said spin and actuator control processes respectively provide said spin data values and actuator data values to said rotating means and positioning means, wherein said microcontroller includes timing means, responsive to a plurality of timing control data values, for initiating the execution of said sector, spin and actuator control processes by said microcontroller, and wherein said microcontroller, in response to said sector data values determines and provides said timing control data values to said timing means such that said spin and actuator control processes are initiated at respective predetermined periods after receipt of said sector mark signal by said microcontroller and said sector control process is initiated a predetermined period in advance of the calculated occurrence of the next said sector mark signal.

2. The disk drive architecture of claim 1 wherein said microcontroller, during the spin control process and in response to the difference in time between the calculated and actual occurrence of the said sector mark, determines and provides a spin data value to said rotating means such that the resultant series of such spin data values controls, in real time, the rotational rate of the disk and wherein said microcontroller, during the actuator control process and responsive to the sector data values, determines and provides an actuator data value to said positioning means for adjusting in the position of said head with respect to the current sector on the surface of said disk.

3. The disk drive architecture of claim 1 or 2 further comprising interface means for transferring data with respect to the host, said interface means being responsive to interface control data values for configuring and directing the operation of said interface means and wherein said microprocessor further executes an interface control process for providing the interface control data values to said interface means, said interface control process being executed by said microprocessor as the normally executing control process, such that said timing means normally interrupts said interface control process to initiate execution of the sector, spin and actuator control processes.

4. A control system providing for the storage of data on a rotating media, wherein an actuator is utilized in the selection of data for storage and retrieval with respect to said media and wherein data is transferred between said control system and a host, said control system comprising:
(a) media control means for selecting a rotational position of said rotating media;
(b) actuator control means for selecting a position of said actuator with respect to said rotating media;
(c) data channel means for transferring data with respect to said rotating media to effect storage and retrieval of data;
(d) interface means for communicating data to and from the host; and
(e) system control means for controlling the immediate operation of said media control means, said actuator control means and said data channel means and for directing the operation of said interface means in real time, said system control means including a single microcontroller and wherein said microcontroller implements real-time media, actuator and data channel control processes to control the immediate operation of said media control means, said actuator control means and said data channel means.

5. The control system of claim 4 wherein said microcontroller comprises means for executing a control task, timing means for providing an interrupt signal, and means, responsive to said timing means, for interrupting the execution of a control task to initiate the execution of an alternate control task, wherein said media, actuator and data channel control processes comprise respective series of alternate control tasks.

6. The control system of claim 5 wherein said timing means provides said interrupt signal to coordinate the periodic, nominally non-mutually alternate execution of the control tasks of said media, actuator and data channel control processes.

7. The control system of claim 6 wherein said microprocessor implements an interface control process for controlling said interface means, wherein said interface control process is comprised of an interface control task and wherein said microprocessor nominally executes said interface control task exclusive of the execution of said alternate control tasks.

8. Apparatus for controlling the storage and retrieval of data on concentric tracks of respective pluralities of sectors in a media in response to a host, said apparatus comprising:
(a) actuator means for selecting a track of said media for the storage and retrieval of data; and
(b) data channel means for transferring data with respect to said media to effect data storage and retrieval;
(c) interface means for transferring data between said data channel means and said host; and
(d) control means for controlling said actuator means, said data channel means and said interface means, said control means including timing means for providing first and second periodic task selection signals to initiate respective active control of said timing means and said actuator means by said control means, said control means being responsive to said data channel means for determining the beginning of said sectors, wherein said control means periodically adjusts the period of said first and second periodic task selection signals with respect to the beginning of said sectors, and wherein said timing means provides said first periodic task selection signal before the expected beginning of each of said sectors and said second periodic task selection signal following beginning of each of said sectors, said control means further including means for executing tasks, wherein said control means initiates execution of sector and actuator control tasks in response to said first and second periodic task selection signals, respectively, said sector task providing for the detection of said sector mark and for adjusting said timing means for the provision of said first and second periodic task selection signals.

9. The control system of claim 8 wherein said actuator means includes head means for reading and writing data and wherein said control means, through each execution of said actuator control task, provides an actuator position select value to said actuator means to adjust the position of said head means with respect to said selected track.

10. The control system of claim 9 wherein said rotating media means includes drive means for rotating said media and wherein said control means, through each execution of said sector control task, provides a rotated position select value to said drive means to direct the rotation of said media.

11. The control system of claim 10 wherein said timing means provides a third periodic task selection signals and wherein said control means initiates execution of a spin control task in response to said third periodic task selection signal, said sector task periodically adjusting said timing means for the provision of said third periodic task selection signal, and wherein said control means, through each execution of said spin control task, determines the rotated position select value for the next sector control task.

12. The control system of claim 11 wherein said control means implements a read/write task for controlling said data channel means and the transfer of data with respect to said data channel means.

13. The control system of claim 8, 11 or 12 wherein the execution of said periodic tasks are non-overlapping through the rotational period of each said sector.

14. The control system of claim 13 wherein said control means implements an interface task for controlling said interface means and the transfer of data between to said interface means and said host, and wherein said control means nominally executes said interface task exclusive of the periodic execution of said control tasks.

15. A control system for managing the storage and retrieval of data with respect to a rotating media, wherein data is stored in tracks of multiple sectors, said control system comprising:
   (a) means for rotating said media;
   (b) means for following a track;
   (c) means for detecting a sector;
   (d) means for reading sector data; and
   (e) controller means for controlling, in real time, said rotating, following, detecting and reading means, wherein said controller means substantially implements, with respect to said rotating, following, and detecting means, the control processes for managing the rotation of said media, the following of a predetermined track, and the selection of a predetermined sector for reading, said controller means including a single microcontroller.

16. The control system of claim 15 wherein said controller means is responsive to a mark signal provided from said detecting means and wherein said controller means implements said control processes as event synchronized to said mark signal.

17. The control system of claim 16 wherein said controller means implements said processes as tasks temporally distributed throughout rotational period of each sector.

18. Apparatus for the controlled storage of data on a media in a plurality of sectors and a sector mark is associated with the beginning of each said sector, said apparatus comprising:
   (a) spin means for rotating said media, said spin means including latched driver means for storing a spin position value and causing a corresponding rotational acceleration force to be applied to said media;
   (b) actuator means for positioning a head sensor with respect to said media, said actuator means including a voice coil driver for electro-mechanically pivoting said actuator means, said actuator means further including positioning means for storing an actuator position value and causing said voice coil driver to apply a corresponding pivoting force to said actuator means;
   (c) means for detecting said sector marks, said detecting means providing a sector mark signal; and
   (d) control means for providing respective series of spin and actuator position values to said spin means and said actuator means, said control means including a microcontroller executing a repeating series of time-based scheduled tasks wherein a first task provides for the determination and provision of said spin position values to said spin means and a second task provides for the determination and provision of said actuator position values to said actuator means, said control means further including timing means, responsive to said detecting means, for scheduling execution of said first and second tasks by said microcontroller at respective predetermined time periods following detection of each said sector mark.

19. The apparatus of claim 18 wherein said timing means includes a plurality of timers and wherein said control means, in executing said sector task, programs said timers for the respective initiation of said time-based scheduled sector, actuator and spin tasks.

20. The apparatus of claim 19 further comprising:
   (a) a data buffer;
   (b) data channel means for converting data for storage on said media and for recovering data received from said media, said data channel means providing and receiving data through said head sensor;
   (c) a dedicated disk controller, responsive to said control means, for transferring data between said buffer and said data channel means; and
   (d) a dedicated host controller, responsive to said control means, for transferring data between said buffer and a host.

21. The apparatus of claim 20 wherein said control means is a microcontroller.

* * * * *